US008032328B2

(12) United States Patent
Samples et al.

(10) Patent No.: US 8,032,328 B2
(45) Date of Patent: Oct. 4, 2011

(54) PROCESS MONITORING TECHNIQUE AND RELATED ACTIONS

(75) Inventors: Paul K. Samples, Scott Depot, WV (US); John R. Parrish, Cross Lanes, WV (US); Debbie D. Rath, Cuero, TX (US); Thomas J. McNeil, Cross Lanes, WV (US)

(73) Assignee: Dow Global Technologies LLC, Midland, MI (US)

( * ) Notice: Subject to any disclaimer, the term of this patent is extended or adjusted under 35 U.S.C. 154(b) by 387 days.

(21) Appl. No.: 12/226,291

(22) PCT Filed: Apr. 13, 2007

(86) PCT No.: PCT/US2007/009059
§ 371 (c)(1),
(2), (4) Date: Oct. 14, 2008

(87) PCT Pub. No.: WO2007/120785
PCT Pub. Date: Oct. 25, 2007

(65) Prior Publication Data
US 2009/0177439 A1 Jul. 9, 2009

Related U.S. Application Data

(60) Provisional application No. 60/792,101, filed on Apr. 14, 2006.

(51) Int. Cl.
*G06F 17/18* (2006.01)
(52) U.S. Cl. .................................................. 702/179
(58) Field of Classification Search .................... 702/179
See application file for complete search history.

(56) References Cited

U.S. PATENT DOCUMENTS

| 5,070,468 A | 12/1991 | Niinomi et al. |
| 5,257,206 A | 10/1993 | Hanson |

(Continued)

FOREIGN PATENT DOCUMENTS

| DE | 10 2004 004 065 A1 | 8/2004 |
| EP | 0508386 A | 10/1992 |
| EP | 1542108 A | 6/2005 |

OTHER PUBLICATIONS

"*Automated Data Validation and Fault Analysis: results of Actual CPI Applications*" Fickelscherer, Richard J.; Lanz, Douglas H.; Chester, Daniel L.; Prepared for Presentation at AIChE 2003 Spring National Meeting, New Orleans, Louisiana Mar. 30-Apr. 3, 2003.

*Primary Examiner* — Aditya Bhat

(57) ABSTRACT

The invention provides a novel method of monitoring a process. The method also has the ability to take predetermined actions based on the monitored data. These actions avoid or mitigate process abnormalities or upsets that might impact product quality, production, and/or process efficiencies. The method includes the steps of: obtaining at least one input process variable; determining a comparative process value based on the at least one input process variable using a first method having a first time-based weighting function; determining an expected process value based on the at least one input process variable using a second method having a second time-based weighting function; determining a first deviation value based on the at least one input process variable or historical data; calculating a limit range having a maximum limit and a minimum limit using the expected process value and the first deviation value; and comparing the comparative process value to the limit range.

19 Claims, 5 Drawing Sheets

U.S. PATENT DOCUMENTS

| | | |
|---|---|---|
| 5,339,527 A | 8/1994 | Clemens, Jr. |
| 5,402,521 A | 3/1995 | Niida et al. |
| 6,182,022 B1 | 1/2001 | Mayle et al. |
| 6,480,810 B1 | 11/2002 | Cardella et al. |
| 6,654,697 B1 | 11/2003 | Eryurek et al. |
| 7,774,165 B2 * | 8/2010 | Renner .................. 702/182 |
| 2003/0079160 A1 | 4/2003 | McGee et al. |
| 2005/0171705 A1 | 8/2005 | Renner |
| 2007/0150220 A1 * | 6/2007 | Bode ........................ 702/84 |

* cited by examiner

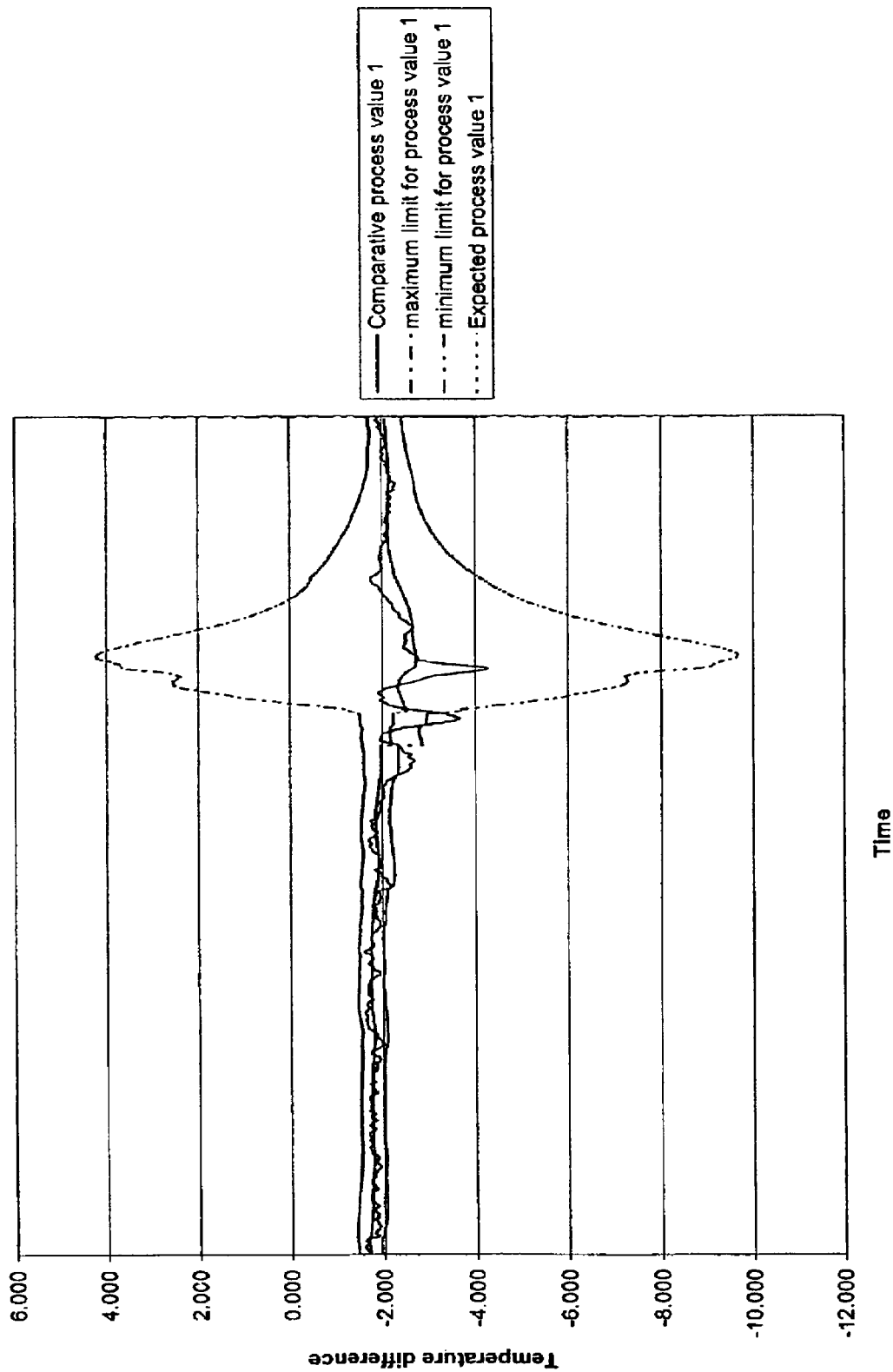

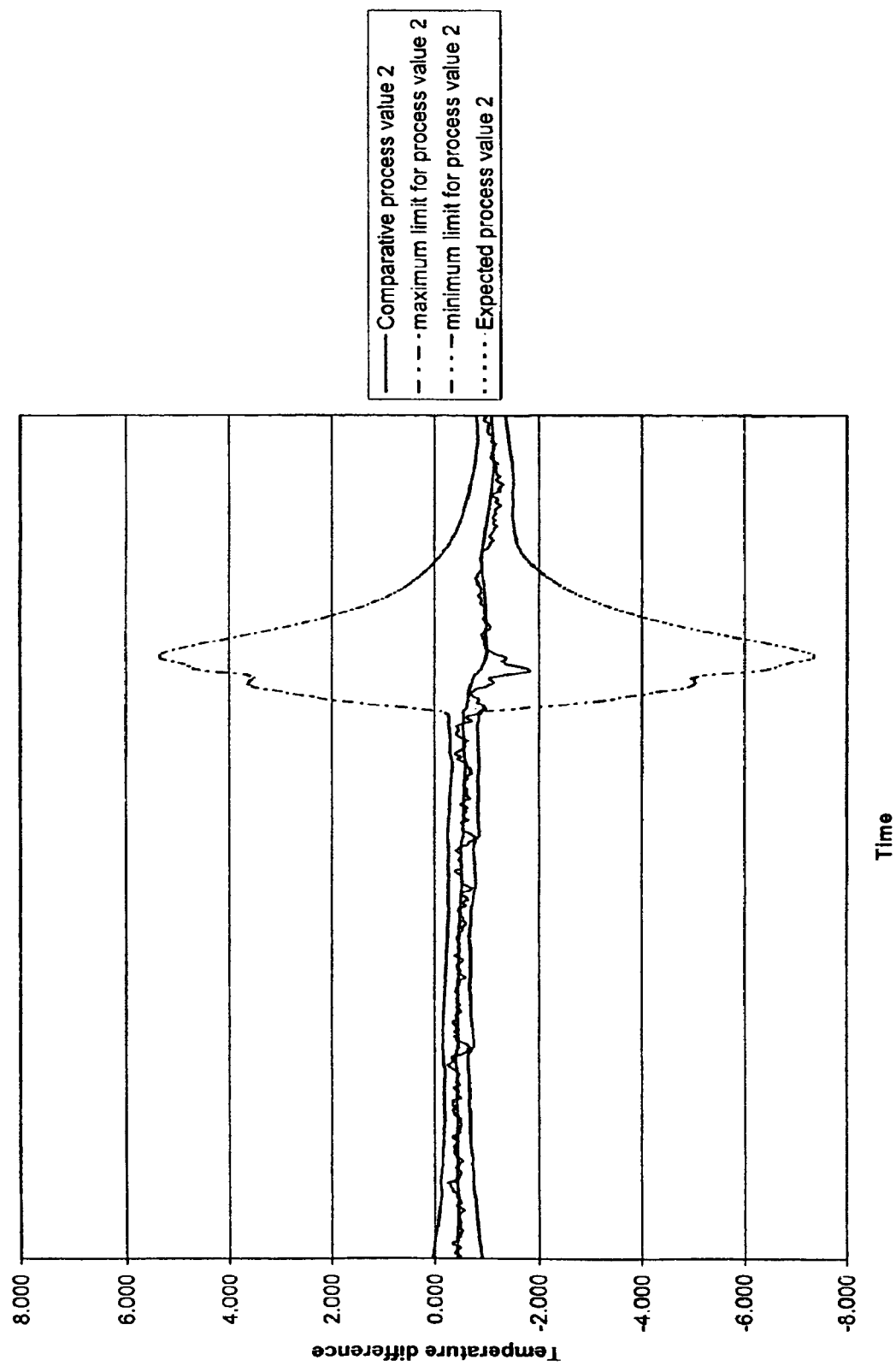

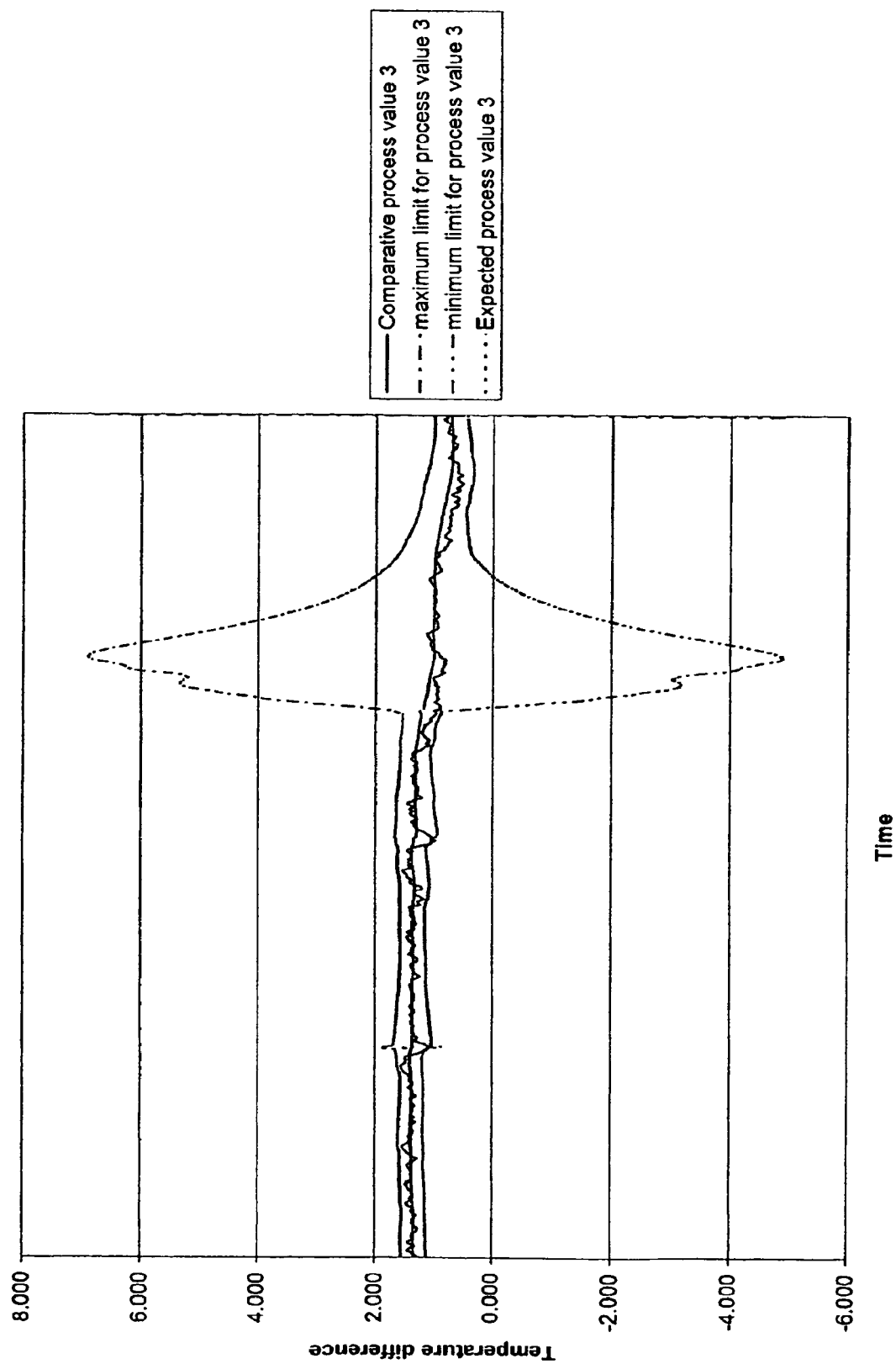

PROCESS MONITORING TECHNIQUE AND RELATED ACTIONS

CROSS-REFERENCE TO RELATED APPLICATIONS

This application is a 35 U.S.C. Section 371 of PCT/US2007/009059 filed Apr. 13, 2007, which claims priority to U.S. Provisional Application Ser. No. 60/792,101 filed Apr. 14, 2006, both of which are incorporated by reference herein in their entirety.

FEDERALLY SPONSORED RESEARCH STATEMENT

Not applicable.

REFERENCE TO MICROFICHE APPENDIX

Not applicable.

FIELD OF THE INVENTION

The invention relates to monitoring process conditions and real-time analysis of multiple process dynamics. Specifically, embodiments of the invention relate to a periodic or intermittent process monitoring method using time-based weighting functions. Real-time information is used along with predetermined limits calculated by using statistical methods to avoid or mitigate abnormal process interruptions.

BACKGROUND OF THE INVENTION

Processes, including chemical, mechanical, electrical, or human, involve numerous conditions having various measurements and data available. These measurements and data change constantly and their values are typically monitored or recorded using a computer system. Examples of such measurements may include temperature, pressure, on/off state, and resistance, to name a few. Using a computer system, these measurements may be subjected to specific gauging operations taking any number of selected measurements at any given time interval, particularly when monitoring or controlling a chemical process. The output of each gauge which reflects a measurement taken, may then be fed into a data base along with an identifier of the selected measurement, commonly called a tag. The data base may then be subjected to selected programs intended to provide the numerical analysis concerning the many parameters in the process. The output of such programs is desirably expressed in forms such as control charts and production record tables, or even video displays, which can then be scanned by the persons responsible for the manufacturing process. Upon the identification of a problem reflected in the representation of the parameters, the necessary corrective action can be identified and taken.

While such control processes represent an improvement over manual operations, there is little time for production personnel to review and interpret the data so that timely corrective action can be taken. This is especially true in chemical process monitoring, where a large number of individual elemental processes are being monitored, each of which is capable of causing a computer to generate data that must be reviewed before a control action can be taken. The production personnel are faced with the substantial problem of even identifying which of the information should be examined for possible problem identification. Due to the large amount of data, there are time delays in process error identification, and related delays in process correction, thus leading to reduced production, non-compliant goods, and/or other process inefficiencies.

Computer applications have also been used to apply simple logic to determine if certain predefined events have occurred based on the various measurements in a process. If events have occurred, then the event is communicated and a predefined action is taken, manual or automatic. In addition, other computer applications have been used to determine if certain process values and measurements are outside of a normal operating envelope. Some techniques that can be used to determine such aberrant conditions include stochastic process models, heuristically determined limits, and process design limits.

Even though such techniques are available, real-time analysis of multiple process dynamics present in a system is needed for better process control. Fast and clear identification of abnormal situations combined with the appropriate corrective actions, preferably without human intervention, would be beneficial.

SUMMARY OF EMBODIMENTS OF THE INVENTION

In one embodiment of the invention, a periodic or intermittent process monitoring method is described. This embodiment includes obtaining at least one input process variable; determining a comparative process value based on the at least one input process variable using a first method having a first time-based weighting function; determining an expected process value based on the at least one input process variable using a second method having a second time-based weighting function; determining a first deviation value based on the at least one input process variable or historical data; calculating a limit range having a maximum limit and a minimum limit using the expected process value and the first deviation value; and comparing the comparative process value to the limit range.

In certain embodiments, the first deviation value is based on the at least one input process variable using a third method having a third time-based weighting function. In other embodiments, the first deviation value determines a high deviation value and a low deviation value. In alternate embodiments, a second deviation value is also determined based on the at least one input process variable or historical data. The second deviation value may be based on the at least one input process variable using a fourth method having a fourth time-based weighting function. In certain embodiments, the first deviation value determines a high deviation value and the second deviation value determines a low deviation value.

In certain embodiments, at least one of the methods for determining the comparative process value, the expected process value or deviation value is different from the remaining methods. Furthermore, at least one of the time-based weighting functions produces a value different from the remaining time-based weighting functions. The first or second method may use a moving average, a recursive moving average, a moving standard deviation, a recursive moving standard deviation, a moving variance, a recursive moving variance, current data, historical data, or frequency analysis of the at least one input process variable. The third method may use a constant, measurement value, moving average, recursive moving average, moving standard deviation, recursive moving standard deviation, moving variance, recursive moving variance, current data, historical data, predictive modeling, or frequency analysis of the at the least one input process variable. The fourth method may use a constant, measurement value, moving average, recursive moving average, moving standard deviation, recursive moving standard deviation, moving variance, recursive moving variance, current data, historical data, predictive modeling, or frequency analysis of the at the least one input process variable.

In some embodiments, the input process variable is measured, calculated or conditioned. In certain embodiments, the input process variable may be temperature, pressure, voltage, flow, weight, switch position, current, power, height, frequency, model prediction error, concentration or physical product property measurement. If the process variable is conditioned, it may be an average, variation or determined using a predictive model calculation. The input process variable may be a calculated intermediate value. If it is a calculated intermediate value, it may be a sum, difference, product, quotient, ratio or estimation of process variables.

In other embodiments, the method also includes the step of taking a predetermined action if the comparative process value is outside the limit range. The method may also include the step of determining if at least one process indicator is provided. The at least one process indicator may be process operating modes, known equipment malfunctions, or alarm conditions. The method may further include the step of providing a predetermined action based on the process indicator.

BRIEF DESCRIPTION OF DRAWINGS

FIG. 3 is a chart depicting an embodiment of the process monitoring technique for process value 1 of the Example.

FIG. 4 is a chart depicting an embodiment of the process monitoring technique for process value 2 of the Example.

FIG. 5 is a chart depicting an embodiment of the process monitoring technique for process value 3 of the Example.

DETAILED DESCRIPTION OF EMBODIMENTS OF THE INVENTION

In the following description, all numbers disclosed herein are approximate values, regardless whether the word "about" or "approximate" is used in connection therewith. They may vary by 1%, 2%, 5%, and sometimes, 10 to 20%. Whenever a numerical range with a lower limit, RL and an upper limit, RU, is disclosed, any number falling within the range is specifically disclosed. In particular, the following numbers within the range are specifically disclosed: R=RL+k*(RU−RL), wherein k is a variable ranging from 1% to 100% with a 1% increment, i.e., k is 1%, 2%, 3%, 4%, 5%, . . . , 50%, 51%, 52%, . . . , 95%, 96%, 97%, 98%, 99%, or 100%. Moreover, any numerical range defined by two R numbers as defined in the above is also specifically disclosed.

Figure 1:
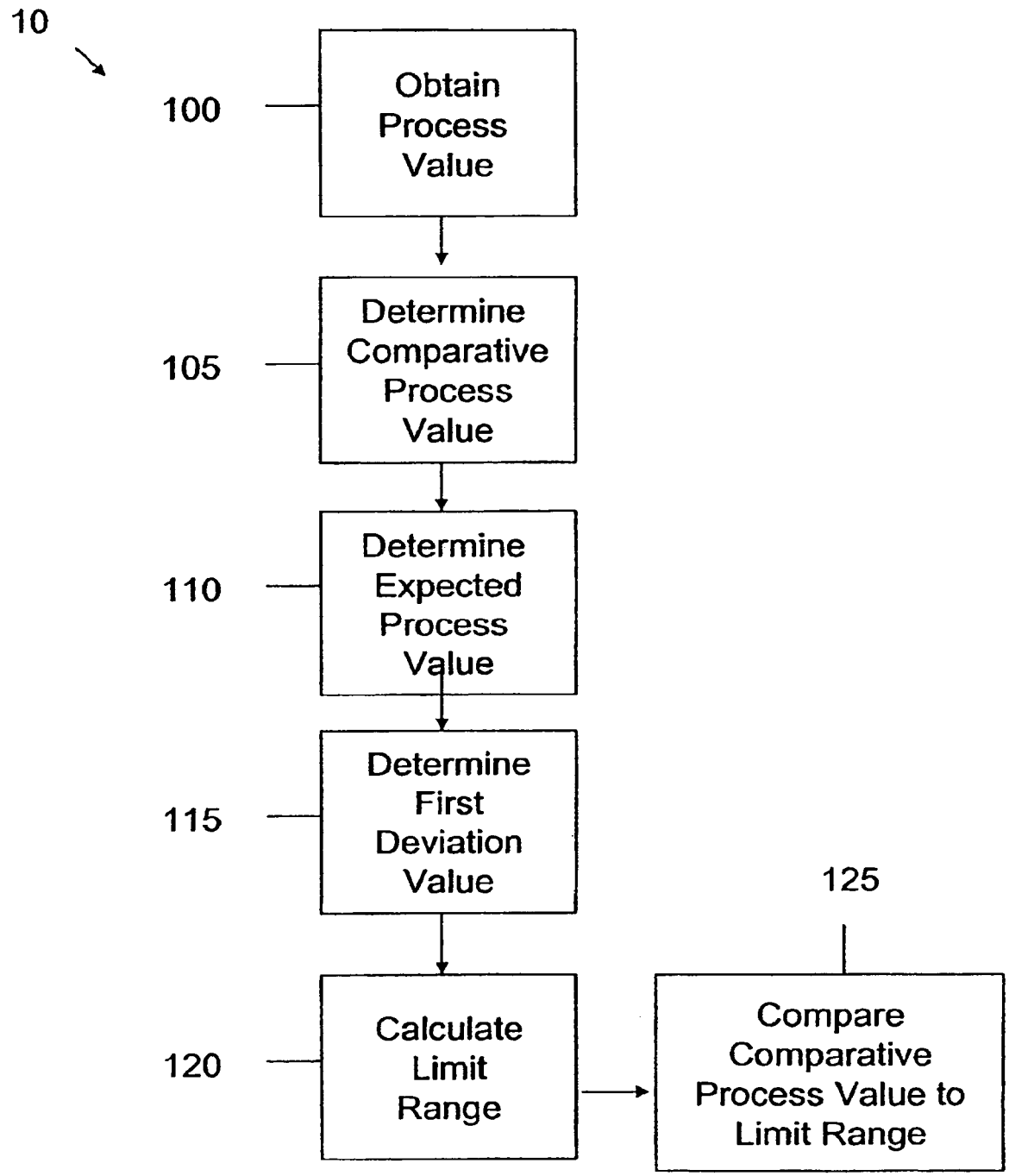
FIG. 1. is a flow diagram for a process monitoring technique.

Embodiments of the invention provide a novel method of monitoring a process. Embodiments of at least some the methods described herein also have the ability to take predetermined actions based on the monitored data. These actions avoid or mitigate process abnormalities or upsets that might impact production, product quality, and/or process efficiencies. Reference is made to FIG. 1, which is a generalized flow diagram showing a periodic or intermittent process monitoring method 10. The method includes a) obtaining at least one input process variable 100; b) determining a comparative process value based on the at least one input process variable using a first method having a first time-based weighting function 105; c) determining an expected process value based on the at least one input process variable using a second method having a second time-based weighting function 110; d) determining a first deviation value based on the at least one input process variable or historical data 115; e) calculating a limit range having a maximum limit and a minimum limit using the expected process value and the first deviation value 120; and f) comparing the comparative process value to the limit range 125. These steps will now be discussed in further detail.

(a) Obtaining at least one input process variable 100. Process variables are values of various process conditions, such as but not limited to, temperatures, pressures, voltages, flows, weights, switch positions, current, power, height, frequency, model prediction error, concentrations, or physical product property measurement. The values are typically generated by process measurement devices as well as computations from various computing devices. The values may be numeric (e.g. 24.12) as well as discrete (e.g. on or off). Communication of the values is commonly done with various process control devices, which can include but are not limited to computers, programmable logic controllers, and distributed control systems. These process variables may be measured, calculated or conditioned. In alternate embodiments, there may be more than one process variable of interest. In a preferred embodiment, the process variables are obtained through a process computer system connected to a distributed control system (DCS). In alternate embodiments, any device which collects and stores data, such as but not limited to a computer, a control system, a data logger, etc. is applicable. The process variables are collected over an operating period at certain intervals. An operating period may be any amount of time. Time can be any denomination. But typically an operating period is on the order of seconds, minutes, hours, or days. In a preferred embodiment, the operating period is 24 hours. In alternate embodiments, the operating period may be, but not limited to, 1, 2, 4, 8, 12, 36, 48 or 72 hours. In alternate embodiments, the operating period may range from about 1-2 hours, about 2-4 hours, about 4-8 hours, about 8-12 hours, about 12-36 hours, about 36-48 hours, or about 48-72 hours. In a preferred embodiment, the interval for data collection is 15 seconds. In alternate embodiments, the interval may be, 10, 30, or 60 seconds. In alternate embodiments, the interval for data collection may range from about 5-10 seconds, about 10-30 seconds, or about 30-60 seconds.

If the process variable is conditioned, it may be an average, variation or determined using a predictive model calculation. In alternate embodiments, the process variable may be an intermediate value that is mathematically or logically created from two or more process variables. Examples of intermediate values include, but are not limited to a sum, difference, product, quotient, ratio or estimation of process variables. In some embodiments where the process condition is a temperature, the temperature is conditioned by determining the difference between two process temperatures, commonly referred to as a temperature delta or ΔT.

(b) Determining a comparative process value based on the at least one process variable using a first method having a first time-based weighting function 105.

The first method having a first time-based weighting function may be selected from the following: a moving average, a recursive moving average, a moving standard deviation, a recursive moving standard deviation, a moving variance, a recursive moving variance, current data, historical data, or frequency analysis of the at least one input process variable. Regardless of the method that is selected, the value is calculated over a specific time window. The method converts the process variable to a value which represents the variable of interest over the recent time period of interest. A time window is the temporal frame of reference over which the process variables, intermediate values, expected values, maximum limits and minimum limits are calculated. Examples include, but are not limited to, the period of time that data is used to calculate averages, filtered averages, variances, predictive calculations. Time can be any denomination that is suitable for the process to be monitored, but is typically on the order of seconds, minutes, hours, or days. In some embodiments, the time window may range from about 1-5 minutes, about 5-15 minutes, about 15-30 minutes, about 30-45 minutes, about 45-60 minutes, or about 60-90 minutes. In some embodiments, the time window may be about 1, 2, 3, 4, 5, 15, 30, 45, 60, 75 or 90 minutes. An appropriate time window should be predetermined based on process characteristics, such as response time, delay time, and noise. In a preferred embodiment, the comparative process value is obtained using a recursive moving average over a 4 minute time window. In alternate embodiments, the comparative process value may be obtained using a recursive moving average over about a 1-2 minute time window, about a 2-4 minute time window, about a 4-10 minute time window, or about a 10-30 minute time window.

A moving average is a method used primarily to convert the data to a value which represents the variable of interest over the recent time period of interest. Each data point is replaced by a weighted average of the data point and its near neighbors. In some embodiments, a moving average method smoothes the data series and distinguish particular features of interest. The moving average is calculated by taking a predetermined number of sequential data points and adding their values and then dividing the sum by the number of data points so added. In other words, a moving average is an average value of a process variable over a specific time period. The average moves over the predetermined time frame. For example, in a 30-second moving average, the data set used in the calculation of the value for the process variable includes the values collected over the preceding 30 seconds. A centered moving average may also be used if desirable. Another method suitable in particular embodiments is a recursive moving average. A recursive moving average calculates the average value at time $t_{(i)}$ using a previously calculated average value (however calculated) for $t_{(i-1)}$ and one or more new data points; thereby approximating a measurement over infinite amount of time by a simple computation.

(c) Determining an expected process value based on the at least one process variable using a second method having a second time-based weighting function 110. An expected process value is a value that is selected based on available information and knowledge to reflect the process condition and typically reflects the process over a predetermined time window. In some embodiments, the expected value is an average value (moving, recursive, or any combination thereof), variation, or other predictive calculation value determined by any suitable data filtering means.

The second method having a second time-based weighting function may be selected from the following: a moving average, a recursive moving average, a moving standard deviation, a recursive moving standard deviation, a moving variance, a recursive moving variance, current data, historical data, or frequency analysis of the at least one input process variable. The method converts the process variable to a value which represents the variable of interest over the recent time period of interest. In a preferred embodiment, the second method determines the expected process value using a recursive moving average over a 90 minute time window. In some embodiments, the time window may range from about 1-5 minutes, about 5-15 minutes, about 15-30 minutes, about 30-45 minutes, about 45-60 minutes, or about 60-90 minutes. In some embodiments, the time window may be about 1, 2, 3, 4, 5, 15, 30, 45, 60, 75 or 90 minutes. The second method may be the same as or different from the first method. In some embodiments, the second method is the same as the first method but uses a different time-based weighting function. The first and second time-based weighting functions should produce values that are different. The comparative process value time-based weighting function should typically cover a shorter time frame than the expected process value time-based weighting function. In a preferred embodiment practice, the current process value time-based weighting function should be on a time frame an order of magnitude less than the time frame of the expected value time-based weighting function.

(d) Determining a first deviation value based on the at least one process variable or historical data 115. The first deviation may be based on the at least one process variable using a third method having a third time-based weighting function. The third method using a third time-based weighting function may be a constant, a measurement value, a moving average, a recursive moving average, a moving standard deviation, a recursive moving standard deviation, a moving variance, a recursive moving variance, current data, historical data, predictive modeling, or frequency analysis of the at the least one input process variable. The first deviation value may also be a constant or a measured value from historical data. In some embodiments, the first deviation value may be a constant bias for the input process variable. In a preferred embodiment, the deviation value is determined using a recursive standard deviation over a 90 minute time window. In some embodiments, the time window may be about 1, 2, 3, 4, 5, 15, 30, 45, 60, 75 or 90 minutes. In some embodiments, the time window may range from about 1-5 minutes, about 5-15 minutes, about 15-30 minutes, about 30-45 minutes, about 45-60 minutes, or about 60-90 minutes. In certain embodiments, the first deviation value will be used as a high deviation value and a low deviation value.

In alternate embodiments of the invention, a second deviation value is determined based on the at least one input process variable or historical data. The second deviation may be based on the at least one process variable using a fourth method having a fourth time-based weighting function. The fourth method using a fourth time-based weighting function may be any method previously described herein. In some embodiments, the first deviation value determines a high deviation value and the second deviation value determines a low deviation value. The third and fourth method may be different or may be the same with a different time-based weighting function. The third and fourth time-based weighting functions should produce values that are different.

In an alternate embodiment, the deviation value has a multiplying factor parameter. The multiplying parameter is chosen based on analysis of process data that provides an appropriate limit condition based on previous variance calculations. It is often affected by process characteristics, product characteristics, and other process variables. The multiplying factor is typically chosen to reflect the normal range of variation one would expect of the related process variable. Deviation values beyond the limit calculated with the multiplying factor suggest appropriate action is needed. In some embodiments, the multiplying factor is two (2) standard deviations. In alternate embodiments, the multiplying factor may range from about 1.1-3 standard deviations, about 3-5 standard deviations, about 5-7 standard deviations, or about 7-10 standard deviations.

(e) Calculating a limit range having a minimum limit and a maximum limit using the expected process value and the first deviation value limit for the process variables 120. Minimum and maximum limits define the region that a process variable would be expected or not expected to fall within over a certain time window. In an alternate embodiment, the second deviation value is also used to calculate the limit range. In a preferred embodiment, the high deviation value and low deviation value are added to the expected process value.

(f) Comparing the comparative process value to the limit range 125. The comparative process value is compared to the limit range calculated in step (e). If the comparative process value is outside the limit range, it may mean that the process needs to be adjusted to return to a normal operating envelope.

Figure 2:
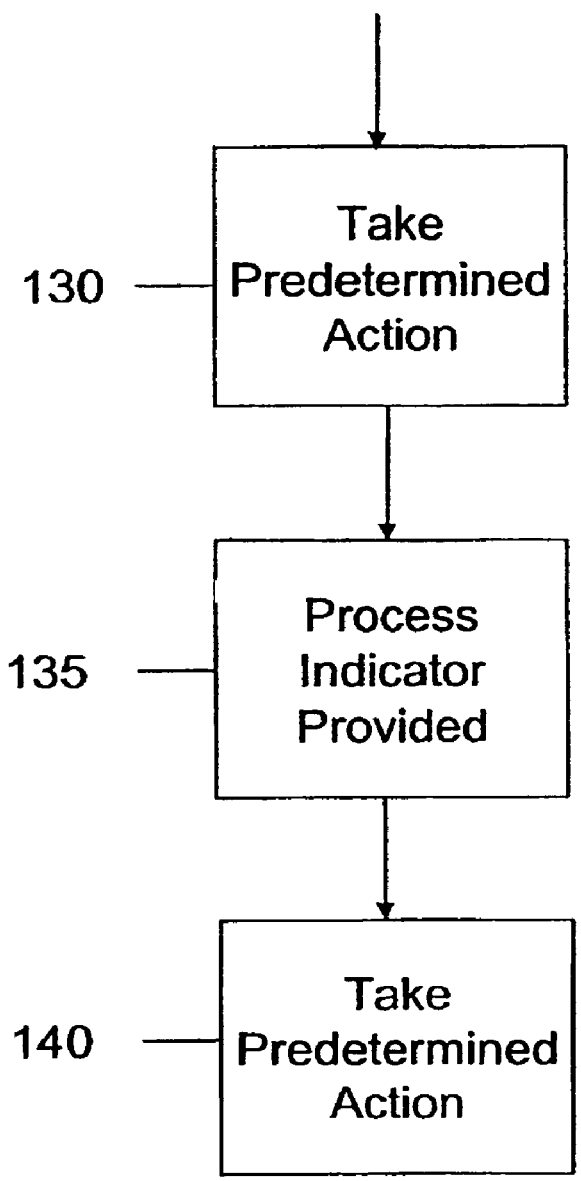
FIG. 2 is an alternate embodiment of the process monitoring technique.

Reference is made to FIG. 2, in an alternate embodiment, the method further comprises taking a predetermined action based on the comparison from step 125. If the comparative process value is not outside the limit range, no action may be taken. If the comparative process value is outside the limit range, a predetermined action 130 may be taken. Predetermined actions are those steps, procedures, or logic done in response to the outcome of the comparison of step 125. Predetermined actions can be manual and/or automated. The predetermined action performs appropriate procedures, programs, or logic to provide avoidance or mitigation of process abnormalities. Examples of predetermined actions may be, but are not limited to, changing one or more operating conditions, such as but no limited to, pressure, temperature, or feed rates. In some embodiments, the predetermined action includes executing a shut down procedure. In other embodiments no predetermined action is taken.

In an alternate embodiment, the process further includes using indicators and conditions from other programs, equipment, etc. to provide further information to the process 135. These indicators or conditions may be, but are not limited to, process operating mode, known equipment malfunctions, and alarm conditions. Using information based on the indicators or conditions, predetermined actions are provided for the purpose of keeping the process performance within desired operating envelope or identifying abnormal changes in operating conditions 140. Predetermined actions are those steps, procedures, or logic done after determining the status of the process indicator. Predetermined actions can be manual and/or automated. The predetermined action performs appropriate procedures, programs, or logic to provide avoidance or mitigation of process abnormalities. Examples of predetermined actions may be, but are not limited to, changing one or more operating conditions, such as but no limited to, pressure, temperature, or feed rates. In some embodiments, the predetermined action includes executing a shut down procedure. In other embodiments no predetermined action is taken.

The following example exemplifies an embodiment of the invention. It does not limit the invention as otherwise described and claimed herein. All numbers in the example are approximate values.

Example 1

A polymerization process is carried out in a gas phase fluidized bed reactor using a metallocene catalyst. The reactor is operated continuously within the following ranges: a) total reactor pressure from about 23.6 to about 24.1 bar absolute (about 343 to about 349 psig); b) reactor bed temperature from about 84.0 to about 95.0° C. The alpha-olefins are and ethylene and hexene-1. The feed gas composition, by weight, is from about 60 to about 63 percent ethylene; from about 6.42 to about 0.44 percent hexene-1; from about 0.177 to about 0.192 percent hydrogen; and the balance includes nitrogen, ethane, methane, and propane.

The reactor bed temperature (RBT) is measured by a resistance temperature detector (RTD) at approximately 30 centimeters above the distributor plate and is inserted approximately 20 centimeters.

Three wall temperatures are measured along the wall of the reactor with thermocouples inserted approximately 0.6 centimeters into the reactor. Wall temperature 1 (WT1) is located approximately 15 centimeters above the reactor distributor plate; wall temperature 2 (WT2) is approximately 90 centimeters above the distributor plate; and wall temperature 3 (WT3) is about 180 centimeters above the distributor plate.

An approximately 24-hour process operating period is examined and the steps of the method are performed cyclically every 15 seconds using a process computer connected to a distributed control system (DCS). The method comprises:

(a) Obtaining at least one process variable. The 4 temperatures described above (RBT, WT1, WT2, and WT3) are acquired from the DCS into the process computer. Using the three reactor wall temperatures (WT1, WT2, and WT3), calculate the difference between the reactor wall temperature and the reactor bed temperature (delta (WTn–RBT)). The difference is an intermediate process variable. Delta (WT1–RBT) varied from about −4.5 to −1.4° C. over the operating period. Delta (WT2–RBT) varied from about −0.8 to 0.7° C. over the operating period. Delta (WT3–RBT) varied from about 0.5 to 1.7° C. over the operating period.

(b) Determining a comparative process value based on the at least one process variable using a first method having a first time-based weighting function. Using a recursive moving average over a 4 minute time window, a comparative process value is calculated for each of the temperature differences. The current process values varied from about −4.3 to −1.6° C. for reactor temperature difference one; about 1.8 to −0.2° C. for reactor temperature difference two; and about 0.5 to 1.5° C. for reactor temperature difference three.

(c) Determining an expected process value based on the at least one process variable using a second method having a second time-based weighting function. Using a recursive moving average over a 90 minute time window, an expected process value for each of the temperature differences is calculated.

(d) Determining a first deviation value based on the at least one process variable. Using a recursive moving standard deviation over a 90 minute time window, calculate the standard deviation for each of the temperature differences. In addition, using a recursive moving standard deviation over a 30 minute time window, calculate the standard deviation for the reactor bed temperature set point. The reactor bed temperature set point standard deviation is intended to account for a higher expected variance of the process when the reactor bed temperature set point is changed. The typical impact of the reactor bed temperature set point is mainly observed during product transitions or process upsets. At other times the reactor bed temperature set point has no impact on the calculated standard deviations as the reactor bed temperature set point is not changing.

The temperature difference standard deviation and the reactor bed set temperature standard are added together for a sum of standard deviations, or sigma, for each temperature difference. The sigma is then multiplied by a multiplying factor parameter, in this case 2.0. The multiplying factor is arrived by analyzing process data and determining the needed sensitivity of the system. The multiplier in this case is 2.0 sigmas (standard deviations) which is a basic statistic fact that is widely known to those skilled in the art.

(e) Calculating a limit range having a minimum and a maximum using the expected process value and the first deviation value limit. The multiplied sigma is subtracted from the calculated expected value for each of the temperature differences to obtain the minimum limit and is added to the calculated expected value for each of the temperature differences to obtain the maximum limit. The minimum limits varied from about −9.7 to −1.9° C. for reactor temperature difference one; about −7.4 to −0.6° C. for reactor temperature difference two; and about −4.9 to 1.2° C. for reactor temperature difference three. The maximum limits varied from about −1.7 to 4.2° C. for reactor temperature difference one; about −0.8 to 5.4° C. for reactor temperature difference two; and about 1.0 to 6.9° C. for reactor temperature difference three.

Table 1 shows exemplary data points of the calculations performed above which are taken every 15 seconds and are used to produce FIGS. 3, 4, and 5.

(f) Comparing the comparative process value to the limit range. The comparative process values from step (b) are compared to their corresponding minimum and maximum limits calculated in step (e). For most of the process operating period, the current process values for all the reactor temperature differences fell within the minimum and maximum limits. FIGS. 3, 4, and 5 are charts depicting the process monitoring technique for process variable 1 (Delta (WT1−RBT)), 2 (Delta (WT2−RBT)) and 3 (Delta (WT3−RBT)), respectively. Referring to FIG. 1, for about 45 minutes the current process value for reactor temperature difference one dropped below the minimum limit (about −2.34° C.). The current process value for reactor temperature difference one returned above the minimum limit for about 39 minutes and then dropped below the minimum limit (about −2.95° C.) for about 25 minutes.

TABLE 1

Exemplary Data points

| | |
|---|---|
| Wall temp 1 (WT1), ° C. | 83.353 |
| Wall temp 2 (WT2), ° C. | 85.402 |
| Wall temp 3 (WT3), ° C. | 86.321 |
| Reactor bed temp (RBT), ° C. | 85.121 |
| Intermediate process variable 1 (delta WT1-RBT), ° C. | −1.768 |
| Intermediate process variable 2 (delta WT2-RBT), ° C. | 0.281 |
| Intermediate process variable 3 (delta WT3-RBT), ° C. | 1.200 |
| Comparative process value 1, ° C. | −1.604 |
| Comparative process value 2, ° C. | −0.416 |
| Comparative process value 3, ° C. | 1.394 |
| Maximum limit for process value 1, ° C. | −1.435 |
| Maximum limit for process value 2, ° C. | 0.016 |
| Maximum limit for process value 3, ° C. | 1.545 |
| Minimum limit for process value 1, ° C. | −1.936 |
| Minimum limit for process value 2, ° C. | −0.879 |
| Minimum limit for process value 3, ° C. | 1.123 |
| Expected process value 1, ° C. | −1.686 |
| Expected process value 2, ° C. | −0.431 |
| Expected process value 3, ° C. | 1.334 |

For most of the process operating period no predetermined actions are taken except for the two violations described above. At two separate times, as described above, the comparative process value was below the minimum limit. When the first violation of the minimum limit for reactor difference one occurred, an operator was notified and other process measurements and calculations, for example reactor resin bed weight and resin fluidized density, were checked and found to be elevated from previous conditions. The catalyst feed to the reactor was substantially reduced in response to the violation. Inspection of the polymer product showed that small chunks and rubble of material had been produced in the reactor during the operating period of the example. A reactor shutdown was avoided due to the operator's actions which were prompted by the process monitoring technique described above.

While the invention has been described with respect to a limited number of embodiments, the specific features of one embodiment should not be attributed to other embodiments of the invention. No single embodiment is representative of all aspects of the inventions. Moreover, variations and modifications therefrom exist. For example, other processes can be monitored with or without data collection using a computer system. In addition, some embodiments of the methods described herein consist of or consist essentially of the enumerated steps. In other embodiments, the steps are performed in a variety of chronological orders. The appended claims intend to cover all such variations and modifications as falling within the scope of the invention. Variation in polymer properties may be decreased by the methods described herein. Because of the decrease in variation, the likelihood of surges with the concomitant production interruption and degradation of resin properties is reduced and production rate can be increased. In addition, production rate and resin properties can be kept closer to desired values. Although this specification discussed embodiments with regard to chemical processes, more specifically, polymerization processes, it should not be limited to only these processes. All processes that would benefit from avoiding or mitigating abnormal process conditions and are capable of acquiring measurements and/or data may be encompassed by this disclosure.

What is claimed is:

1. A periodic or intermittent chemical process monitoring method comprising
   a) obtaining at least one input process variable;
   b) determining a comparative process value based on at least one input process variable using a first method having a first time-based weighting function;
   c) determining an expected process value based on the at least one input process variable using a second method having a second time-based weighting function;
   d) determining a first deviation value based on the at least one input process variable or historical data;
   e) calculating a limit range having a maximum limit and a minimum limit using the expected process value and the first deviation value; and
   f) comparing the comparative process value to the limit range,
   wherein the at least one input process variable is temperature, pressure, voltage, flow, weight, switch position, current, power, height, frequency, model prediction error, concentration or physical product property measurement; and
   wherein at least one of steps a), b), c), d), e) or f) is accomplished using a computer system.

2. The method of claim 1, wherein the first deviation value is based on the at least one input process variable using a third method having a third time-based weighting function.

3. The method of claim 2, wherein the first deviation value determines a high deviation value and a low deviation value.

4. The method of claim 2, further comprising a second deviation value based on the at least one input process variable or historical data.

5. The method of claim 4, wherein the second deviation value is based on the at least one input process variable using a fourth method having a fourth time-based weighting function.

6. The method of claim 5, wherein the first deviation value determines a high deviation value and the second deviation value determines a low deviation value.

7. The method of claim 5, wherein the fourth method uses a measurement value, moving average, recursive moving average, moving standard deviation, recursive moving standard deviation, moving variance, recursive moving variance, predictive modeling, or frequency analysis of the at the least one input process variable.

8. The method of claim 2, wherein at least one of the methods is different from the remaining methods.

9. The method of claim 2, wherein at least one of the time-based weighting functions produces a value different from the remaining time-based weighting functions.

10. The method of claim 2, wherein the third method uses a constant, measurement value, moving average, recursive moving average, moving standard deviation, recursive moving standard deviation, moving variance, recursive moving variance, predictive modeling, or frequency analysis of the at the least one input process variable.

11. The method of claim 1, wherein the at least one input process variable is measured, calculated or conditioned.

12. The method of claim 11, wherein the conditioned process variable is an average, variation or determined using a predictive model calculation.

13. The method of claim 1, wherein the first or second method uses a moving average, a recursive moving average, a moving standard deviation, a recursive moving standard deviation, a moving variance, a recursive moving variance, or frequency analysis of the at least one input process variable.

14. The method claim 1, wherein the at least one input process variable is a calculated intermediate value.

15. The method of claim 14, wherein the calculated intermediate value comprises a sum, difference, product, quotient, ratio or estimation of process variables.

16. The method of claim 1, further comprising taking a predetermined action if the comparative process value is outside the limit range.

17. The method of claim 16, further comprising determining if at least one process indicator is provided.

18. The method of claim 17, wherein the at least one process indicator comprises process operating modes, known equipment malfunctions, or alarm conditions.

19. The method of claim 18, further comprising providing a predetermined action based on the process indicator.

* * * * *